Jan. 4, 1966 G. DEMMEL 3,227,801

COMMUNICATION CABLE

Filed Aug. 22, 1963 4 Sheets-Sheet 1

Inventor:
Georg Demmel,
By [signature]
Atty.

Jnventor:
Georg Demmel,
By [signature] Atty.

COMMUNICATION CABLE

Filed Aug. 22, 1963 4 Sheets-Sheet 3

Jnventor:
Georg Demmel.
By
atty.

Inventor:
Georg Demmel,
By [signature] atty

United States Patent Office 3,227,801
Patented Jan. 4, 1966

3,227,801
COMMUNICATION CABLE

Georg Demmel, Berlin-Siemensstadt, Germany, assignor to Siemens & Halske Aktiengesellschaft, Berlin and Munich, Germany, a German corporation
Filed Aug. 22, 1963, Ser. No. 303,896
2 Claims. (Cl. 174—34)

The present application is a continuation-in-part of copending application Serial No. 818,083, filed June 4, 1959, now abandoned which is owned by the assignee also named in the present case.

The invention disclosed herein is concerned with a communication cable containing at least one layer of stranded unshielded individual conductors which are at spaced apart points mutually systematically crossed.

An object of the invention resides in carrying out the systematic crossings of the stranded conductors according to definite accurately defined crossing plans.

Another object and feature of the invention resides in that the crossing plans are so designed that no disturbing couplings are produced between two-conductor lines formed of crossed stranded conductors extending within a given layer.

A further object resides in designing the crossing plans so that the crossings of the stranded conductors can be effected by machine operation.

Still another object of the invention resides in effecting the crossings of the stranded conductors and to combine conductors in such a manner that phantom circuits can possibly be formed from all two-conductor lines of a given layer.

The various objects and features of the invention will appear from the description which is rendered below with reference to the accompanying drawings, in which FIG. 1 shows as an example a cable having a single stranded layer of twelve individual conductors 1–12;

FIG. 2 indicates for these twelve conductors the systematic crossings for a crossing section *s* which may have a length of about 5 meters (16.4 ft.), the conductors 1-12 being shown distributed in a single plane;

Figures 1, 2, 3:
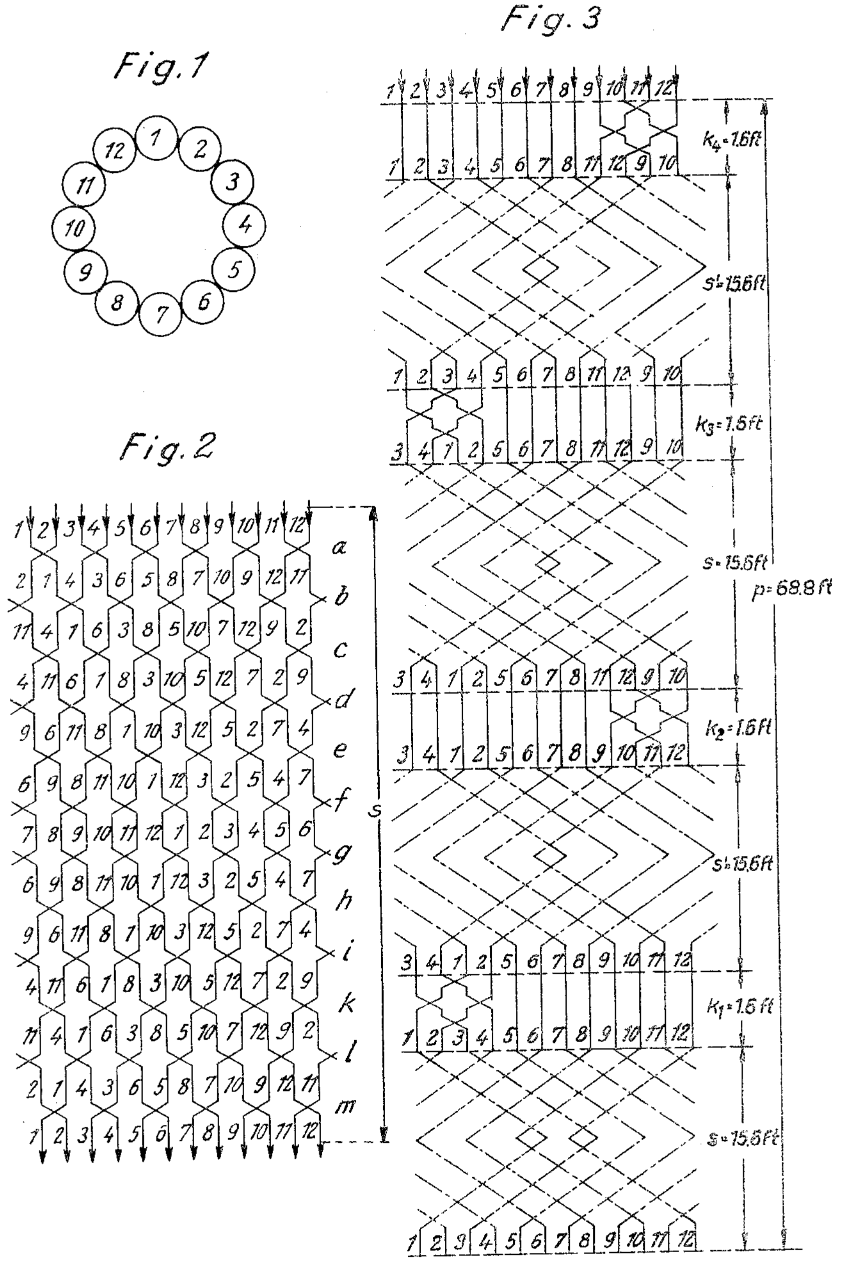
FIG. 3 illustrates in schematic manner the provision of auxiliary conductor crossings, within conductors-position-change sections *k* which are very short as compared with the crossing sections, for reducing the inductive couplings of the even numbered two-conductor lines among themselves and of the odd numbered two-conductor lines among themselves.
Figure 5:
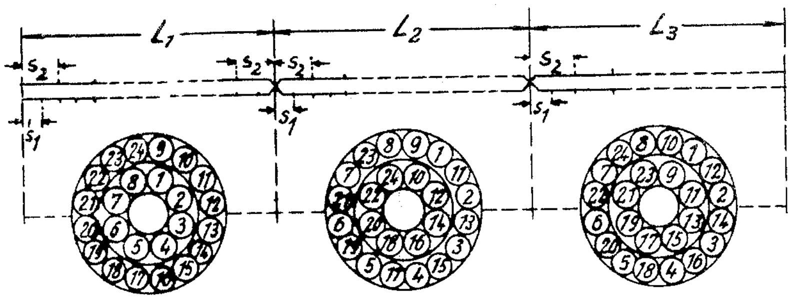
Figure 6:
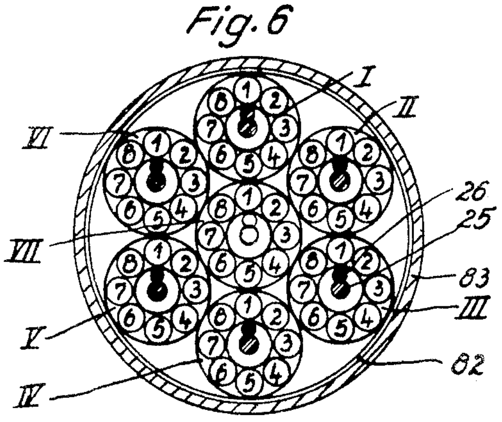
Figure 7:
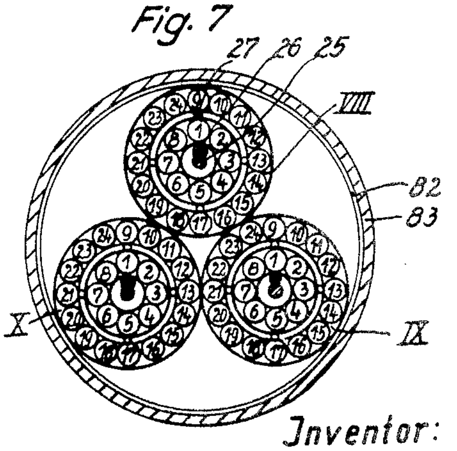
Figure 8:
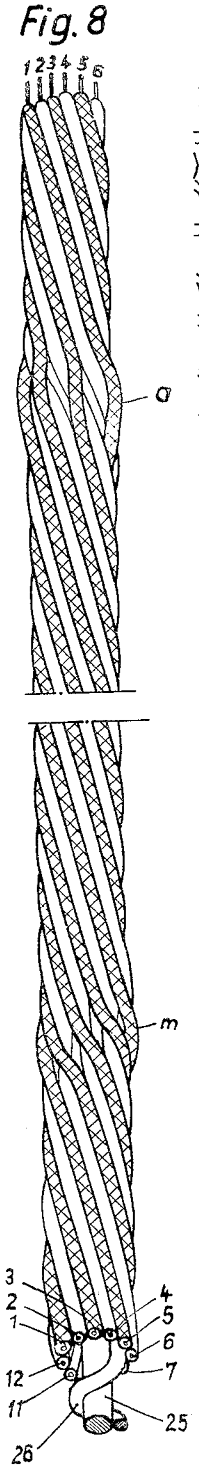
Figure 9:
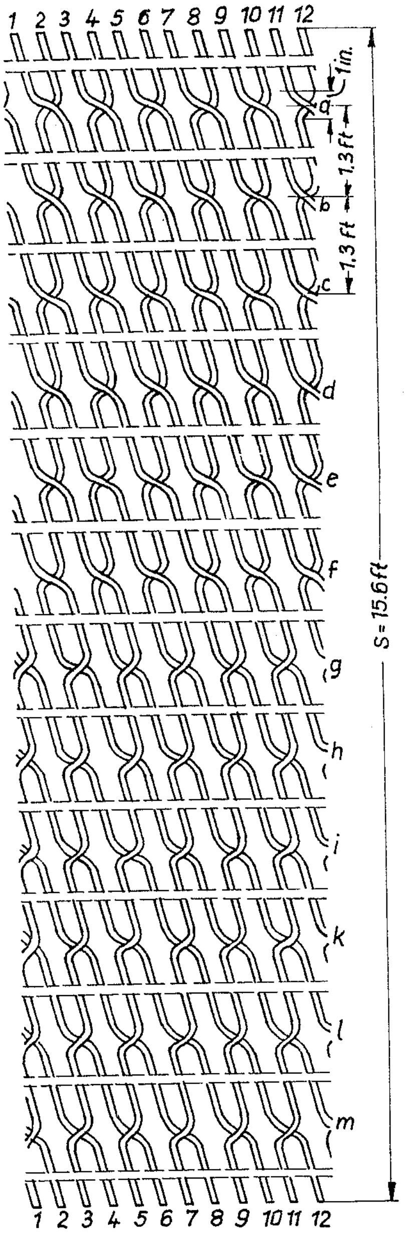
Figure 10:
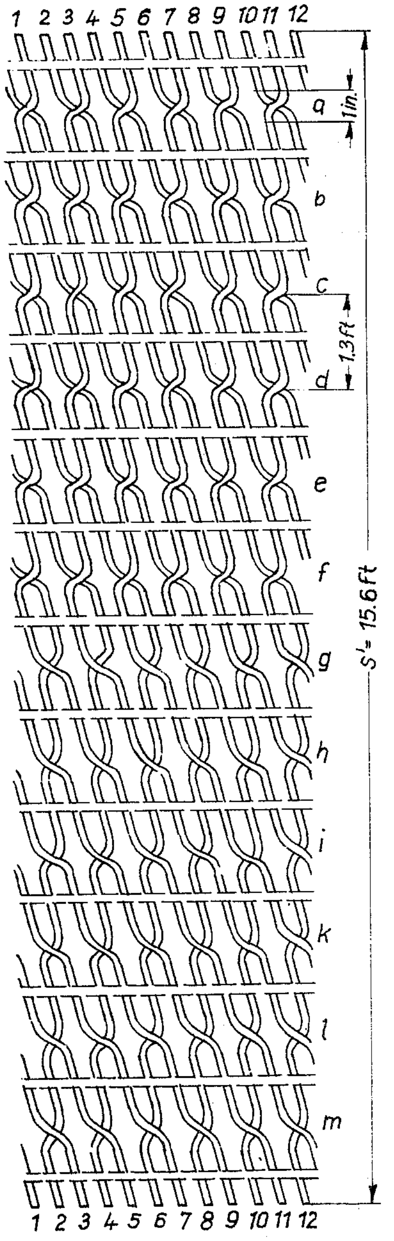
Figure 12:
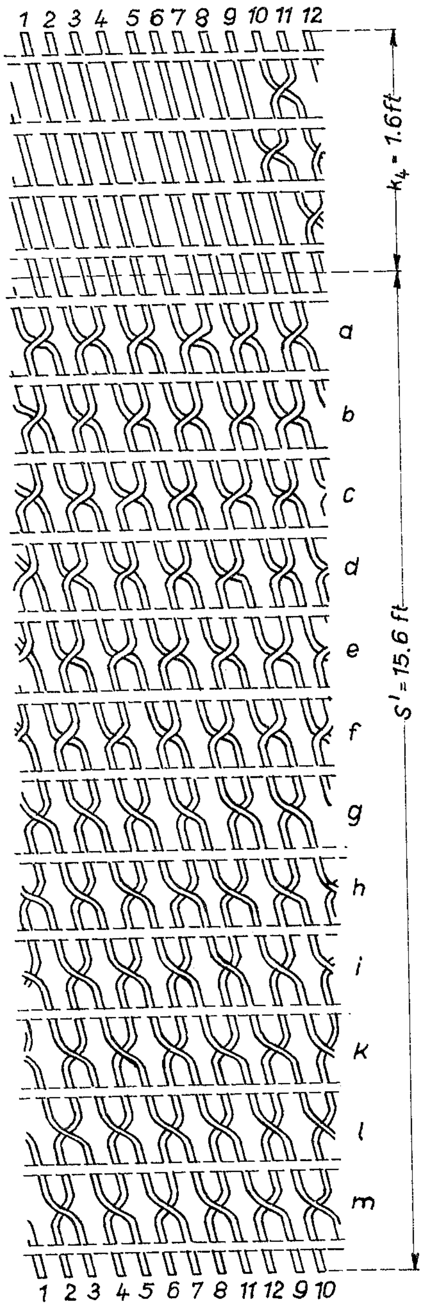
Figure 11:
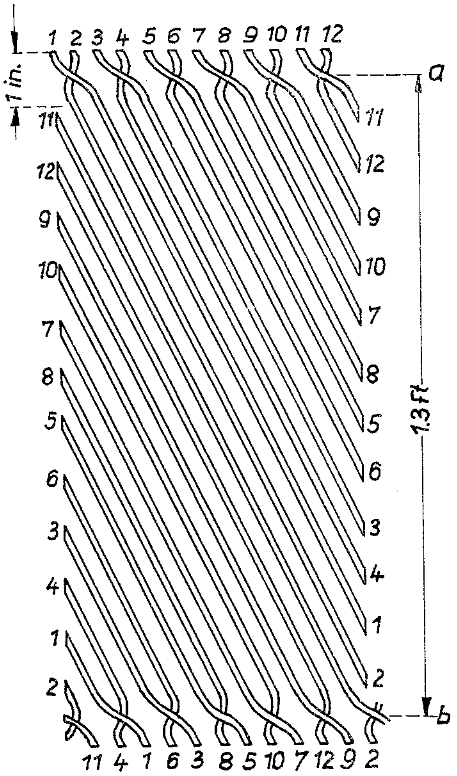

FIG. 5 indicates a manufactured length or section having three layers-position-exchange sections $L_1$, $L_2$ and $L_3$;

FIGS. 6 and 7 show communication cables comprising a plurality of units of stranded individual conductors;

FIG. 8 shows in perspective representation a unit of conductors stranded about a core and having two crossing points;

FIG. 9 shows in greater detail the crossing section according to FIG. 2;

FIG. 10 shows a crossing section differing somewhat from the one indicated in FIGS. 2 and 9;

FIG. 11 shows the two successive crossing points *a* and *b* of FIG. 2, as well as in somewhat clearer form the position of the conductors; and FIG. 12 shows in somewhat clearer form a part of the decoupling section of FIG. 3.

In accordance with the invention, conductors which do not belong to a two-conductor line are within manufactured or fabricated cable lengths or sections likewise crossed in predetermined short spacings or intervals. The spacings between crossing points correspond preferably to the length of the customary twists. The crossings are preferably carried out between two conductors neighboring on the crossing point. Predetermined short crossing sections are suitably formed and, assuming a given count sequence, all even numbered and all odd numbered conductors of each layer are within these crossing sections mutually crossed in short spacings. Particularly favorable conditions result from the disposal, within a crossing section, of each odd numbered conductor, at the beginning of the section, neighboring on each even numbered conductor upon identical or nearly identical partial lengths of the section. The result is that no two-conductor line will be neighbor on another one, that is, no two-conductor line will be capacitively coupled with another two-conductor line, over a cable section longer than $4/n$ of the cable length L, wherein $n$=number of conductors in the layer. For example, with $n=16$, the path of capacitive coupling will be at the most $L/4$, constituting a considerable improvement as compared with twisted pairs or quads in which case very many pairs are capacitively coupled along the whole cable length.

The utilization of the above described or similar crossing schemes or plans makes it possible to provide at the beginning and at the end of each crossing section the same count sequence of conductors. The crossings are advantageously carried out so that the even numbered and the odd numbered conductors retain among themselves the respective relative positions, and further, so that the odd numbered conductors are at each crossing point displaced by a predetermined peripheral angle with respect to the even numbered conductors. All conductors of a layer are between the crossing points stranded as usual in the same direction, without changing position with respect to one another. The relative direction of displacement of the even numbered and of the odd numbered conductors at the crossing points is reversed in the layer suitably after a displacement of the conductors by about 180°.

The above noted rules for carrying out the crossings effects within a crossing section the systematic elimination of the capacitive and magnetic couplings between two-conductor lines formed respectively of two desired even numbered and of two desired odd numbered conductors. However, inductive couplings of the even numbered two-conductor lines to each other and of the odd-numbered two-conductor lines to each other are not systematically eliminated within a crossing section. In order to also eliminate these couplings, some even numbered conductors and some odd numbered conductors are at the end of a crossing section transposed so that at the beginning of the next crossing section there is another count sequence of the conductors. This transposition is effected by additional or auxiliary crossings of some conductors at conductors-position-change-sections *k* which are short compared with the crossing section. The new count sequence of the conductors is so provided that the systematic inductive couplings cancel the residual systematic couplings of the preceding crossing section.

A basic advantage of the invention is seen in the fact that two-conductor lines can be formed of any two desired even numbered conductors and of any two desired odd numbered conductors. A simple embodiment results upon employing the crossing scheme according to the invention and forming two-conductor lines in known manner respectively of two-conductors which are indirectly adjacent to each, thereby obtaining for the two-conductor lines with far reaching decoupling, strongly reduced mutual capacitance values and inductance values and therewith low line attenuation. Still more favorable transmission properties are obtained by forming the two-conductor lines in likewise known manner respectively of two respectively even numbered and odd numbered conductors disposed in respective layers diametrically opposite. It is for the use of the crossing schemes according to the invention advantageous when the number of conductors in each layer is divisible by 4. It is for reasons of manufacture and mutual decoupling of the two-conductor lines of advantage to design the cable of units of stranded individual conductors. A great number of such units can be combined in a cable and, if desired, such units can likewise be stranded in layers. The individual units consist advantageously respectively either of a single layer of eight conductors or of two layers with the inner layer having eight conductors and the outer layer having sixteen conductors. The advantage of making units each with a single layer of eight conductors is that they do not require any auxiliary crossings for the elimination of inductive couplings; moreover, the conductor exchanges can be effected with simple devices.

As illustrated in FIGS. 1 and 2, in order to mutually cross within the crossing sections all odd numbered conductors 1, 3, 5 . . . and all even numbered conductors 2, 4, 6 . . . there are required twelve crossing points *a–m* which are spaced apart one from the other by about 40 centimeters (=15.75 in. =1.31 ft.). From the twelve conductors are formed six two-conductor lines, namely, three two-conductor lines of the six odd numbered conductors 1, 3, 5 . . . and three two-conductor lines of the even numbered conductors 2, 4, 6 . . . Inasmuch as the respective two-conductor lines can be formed of any desired odd numbered conductors and of any desired even numbered conductors, there is the possibility to select the most favorable three two-conductor lines based upon coupling measurements. However, the respective two-conductor lines are suitably formed each of conductors which are indirectly adjacent to each other, that is, two-conductor lines 1/3, 2/4, 5/7, 6/8, etc., or of two diagonally positioned conductors 1/7, 2/8, 3/9, 4/10, etc. As is apparent, the crossings are effected so that the even numbered conductors and the odd numbered conductors retain among themselves their relative positions, whereby the odd numbered conductors are relative to the even numbered conductors at each crossing point displaced or shifted by a definite peripheral angle. The relative direction of displacement of the conductors is altered after displacement of the conductors by 180° in peripheral direction. In order to avoid disturbing localized cable thickening at the crossing points, the six crossings to be effected at each point may be mutually shifted by a small amount in longitudinal direction, about 10–20 millimeters (.4–.8 in.), depending upon the thickening resulting from the crossing of the conductors.

FIG. 8 shows in perspective representation and on a large scale, the stranding of the twelve conductors 1 to 12 about a forming core 25 about which is wound a forming strand 26. Of the twelve crossing points *a–m* of crossing section *s*, only the first crossing point *a* and the last crossing point *m* are represented in this figure. As will be seen, the conductors lie between the respective crossing points in parallel relationship, forming a closed layer of conductors which are stranded about the core in the same twist direction.

In FIGS. 9 and 10, the conductors 1 to 12 are as in FIG. 2 shown spread out in the plane of the drawing in spaced apart relationship. The oblique disposition of the conductors is intended to represent the stranding thereof in the respective layer. The mutual spacing of the crossing points is indicated to amount to 1.3 ft. (39.6 cm.), so that the length of the crossing section *s* amounts to 15.6 ft. (4.75 m.). The length of a crossing point amounts, in the case of a thickness of conductors of about 0.05 in. (1.27 mm.) to 1 in. (2.54 mm.). Accordingly, the interval between crossing points, along which the conductors extend in parallel and along which they are stranded, amounts in the case of the assumed dimensions approximately to sixteen times the length of a crossing point and it follows, therefore, that the major part of the cable consists of stranded conductors which extend in parallel mutually adjacent relationship. However, a greater mutual spacing between the crossing points can be provided in many cases.

The systematic crossings within the crossing section *s*, as indicated in FIG. 9, corresponds with the crossings shown in FIG. 2. In this embodiment, the odd numbered conductors are at the crossing points *a–f*, crossed with the even numbered conductors lying respectively at the right thereof. In FIG. 10, the odd numbered conductors are at the crossing points *a–f* crossed with the even numbered conductors lying at the left thereof. In both embodiments is effected at the crossing point *g*, a reversal of the crossing direction or transposition direction of the conductors, so that the odd numbered conductors are in FIG. 9 at the crossing points *g–m* crossed with the even numbered conductors lying at the left thereof, while odd numbered conductors are at such crossing point, in FIG. 10, crossed with the even numbered conductors lying at the right thereof. The crossing section is in FIG. 10 designated by *s'* so as to distinguish it from FIG. 9.

FIG. 11 shows for further explanation, and on an enlarged scale as compared with FIGS. 9 and 10, the crossings at the crossing points *a* and *b* and the disposition of the conductors between these crossing points. The conductors are shown spaced apart and spread out in the plane of the drawing, it being assumed that the conductors the between the crossing points twisted or stranded once about the core, so that the mutual spacing of the crossing points *a* and *b* corresponds to the length of the stranding twist of the conductors. However, it is preferred to make the mutual spacing between the crossing points as great as possible so as to provide a greater crossing interval than the twist length with which the conductors are stranded about the core. FIG. 11 is not drawn to scale, which is apparent from the fact that the length of the crossing point is indicated to amount to 1 in., the spacing between the crossing points being indicated to amount to 1.3 ft.

The manner in which the inductive coupling among the even numbered two-conductor lines and among the odd numbered two-conductor lines is effected, by changing the count sequence of the conductors by means of auxiliary conductor crossings within conductors-position-change portions *k* which are very short as compared with the crossing sections, is apparent from FIG. 3, such figure showing a decoupling section *p* consisting of two crossing sections *s* and two crossing sections *s'* for crossing out the couplings between all even numbered and odd numbered two-conductor lines, and four conductors-position-change sections $k_1$, $k_2$, $k_3$, $k_4$ for cancelling the residual inductive couplings. The crossing sections *s* may be formed individually according to the crossing scheme shown in FIG. 2. For the crossing sections *s'*, however, is provided a shifting of the conductors at the crossing points in opposite peripheral direction, thereby obtaining within two successive crossing sections *s* and *s'* a shifting of the conductors in peripheral direction by about 360°. Expressed in other words, the conductors are by the crossings shifted from their normal position by ±180°. As will be seen, the even numbered and the odd numbered conductors-position-change sections respectively mutually additionally crossed. The result is that the successive crossing sections differ merely by a different sequence of the conductors at the beginning of the section. The number of crossing sections *s* and of the conductors-position-change sections *k* per coupling section can of course differ from those shown in the illustrated example. The object is to form the decoupling section of as many crossing sections $s$ and conductors-position-change sections $k$ as are required for capacitively and magnetically decoupling all two-conductor lines of a layer within such a decoupling section.

FIG. 12 shows the conductors-position-change section $k_4$ and the crossing section $s'$ (FIGS. 9 and 10) which is contiguous thereto, in order to bring out more clearly the crossings provided in FIG. 3 and also the positions of the conductors. In agreement with FIG. 3, the conductors 10 and 11 are in the conductors-position-change section $k_4$ crossed at the first crossing point, the conductors 9 and 11 and 10 and 11 are crossed at the second crossing point, and the conductors 9 and 12 are crossed at the third crossing point. It is assumed that the conductors-position-change section has a length of 1.6 ft. (48.8 cm.). A comparsion shows that the crossing section $s'$ agrees with the representation in FIG. 10. The manner in which the indicated crossings are to be provided in other conductors-position-change sections $k_3$, $k_2$ and $k_1$, will be immediately clear from the conductors-position-change section $k_4$. FIG. 12 also shows the transition from the conductors-position-change section to the crossing section which is adjacent thereto. The construction of the crossing sections $s$ and $s'$, indicated in the decoupling section $p$, in FIG. 3, can be readily derived from FIGS. 9 and 10. Since the decoupling section comprises four crossing sections each with a length of 15.6 ft., and four conductors-position-change sections each with a length of 1.6 ft., there will result for the entire decoupling section a length of 68.8 ft. (20.97 m.). These values have been entered in FIG. 3.

Figure 4:
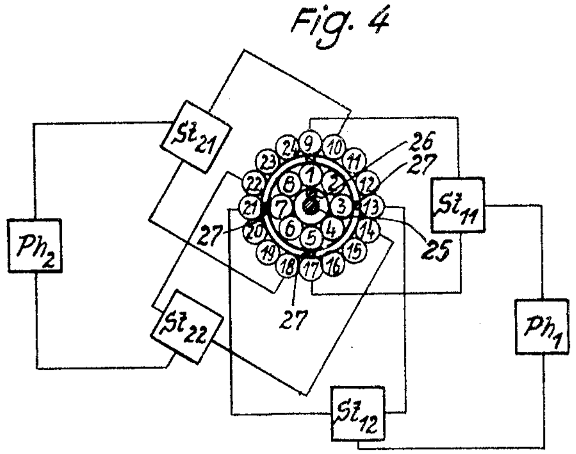
FIG. 4 represents a sectional view of a unit comprising an inner layer of eight conductors and an outer layer of sixteen conductors, the conductors of the inner layer being stranded about a hollow core; and represents further the forming of phantom circuits.

As already mentioned, it is particularly advantageous to design the communication cable of individual units of stranded individual conductors. FIG. 4 shows in sectional view a unit having an inner layer of eight conductors and an outer layer of sixteen conductors, the conductors of the inner layer being stranded about a hollow core. In the illustrated example, the hollow core consists of a central forming strand 25 carrying a further forming strand 26 which is wound thereon in open helical turns, thus resulting in spaces extending between the turns of the forming strand 26, such spaces serving to receive thickened cable portions appearing at the crossing points. A plurality of forming strands such as 26 may be wound about the central forming strand if desired. The forming strands are advantageously made of a thermoplastic synthetic material such as polyethylene. The outer diameter of the hollow core shall be dimensioned so that $$D=\left(\frac{n}{\pi}-1\right)\cdot d$$

wherein $n$ is the number of the conductors stranded about the hollow core and $d$ is the diameter of the respective conductors. Between the outer and inner layers are disposed further forming strands 27, in the illustrated example, four forming strands 27, wound in open helical turns, thus forming spaces for receiving thickened portions appearing at the crossing points of the outer layer. The forming strands 27 may also be made of polyethylene or the like. It is, however, possible to use in place of these forming strands insulated conductors which may, for example, serve as test conductors. It is in this manner possible to provide for the formation of the hollow space layer two polystyrene threads and two testing conductors. The diameter $d_e$ of the forming strands is provided in accordance with the equation $$d_e=\frac{1}{2\pi}(d_1\cdot n_2-d_1\cdot n_1)-\frac{d_1+d_2}{2}$$

wherein $d_2$ is the diameter of the conductors of the outer layer, $d_1$ the diameter of the conductors of the inner layer, $n_2$ the number of conductors in the outer layer, and $n_1$ the number of conductors in the inner layer. The unit according to FIG. 4 is of course stranded in two operations advantageously with twists of opposite twist directions. The twist lengths of the layers are provided with the crossing sections so that no systematic couplings can occur between the two-conductor lines of the respective layers.

In order to obtain, in the case of multi-layer cables or units for the two-conductor lines of the various layers, identical transmission properties, such as identical characteristic impedance and identical phase shift, the unit may be constructed (stranded) so that the conductors of both layers are stranded in one operation without intermediate spacers and with the same twist length and the same twist direction, thus giving the possibility to exchange groups of conductors between the layers at intervals. In a unit with two layers, the conductors of the inner layer or a group of conductors of the inner layer, can in this manner be mutually exchanged with a group of conductors of the outer layer at intervals. An advantageous construction for two layers may be obtained by forming a section with identical transmission properties for two neighboring layers, for example, a manufactured or fabricated length or section, comprising three layers-position-exchange sections and thereby exchanging in the second position-exchange section the even numbered conductors of the outer layer and in the third position-exchange section the odd numbered conductors, with the conductors of the inner layer. A corresponding example will now be described with reference to FIG. 5.

It is assumed in FIG. 5, that a manufactured cable length or section comprises three layers-position-exchange sections $L_1$–$L_2$–$L_3$. Each section has many crossing sections $s$, the crossing sections of the inner or first layer being indicated by $s_1$ and those of the outer or second layer being indicated by $s_2$. The crossing sections $s$ are in the successive layers of different lengths so as to decouple also the two-conductor lines of one layer with respect to the other layer. In the illustrated example, the length of the crossing sections $s_2$ of the outer layer is twice the length of the crossing sections $s_1$ of the inner layer. The position of the conductors in the three sections $L_1$–$L_2$–$L_3$ is seen in the illustrated sectional views. In the section $L_1$ obtains the normal conductor position corresponding to FIG. 4. At the layers-exchange point between the sections $L_1$ and $L_2$, the conductors 1–8 of the inner layer are transferred to the outer layer and the even numbered conductors of the outer layer are transferred into the inner layer. At the next successive layers-position exchange point between the sections $L_2$ and $L_3$, the odd numbered conductors of the outer layer are exchanged for the even numbered conductors belonging to the outer layer, so that the odd numbered conductors of the outer layer are now positioned in the inner layer. At the transition to the next adjacent layers-position-exchange section, the inwardly positioned odd numbered conductors belonging to the outer layer will be exchanged with the outwardly positioned conductors belonging to the inner layer, thereby again producing the normal conductor positions according to the section $L_1$.

FIG. 6 shows an example of a communication cable designed of seven units I to VII, each unit having eight individual conductors 1 to 8. The units I to VI are stranded about the centrally located unit VII. Numeral 82 indicates a cover layer and 83 the cable armor or sheath.

FIG. 7 shows a communication cable having three units VIII, IX and X, each unit comprising, as shown in FIG. 4, an inner layer with conductors 1 to 8 and an outer layer with sixteen conductors indicated by numerals 9 to 24. The covering and the sheath are again indicated by numerals 82 and 83.

Different colors and different markings may serve for the identification of the odd and even numbered conductors in the various layers. It is, for example, in the case of the unit shown in FIG. 4, possible to use yellow for the odd numbered conductors and red for the even numbered conductors in the inner layer, and to provide for further distinguishing of these conductors half of the two-conductor lines with additional markings, for example, with relatively closely spaced apart annular color strips. A similar scheme may be used for the conductors of the outer layer, employing, of course, different colors, for example, green for the odd numbered conductors and blue for the even numbered conductors, and again identifying half of the two-conductor lines with additional markings, for example, in the form of annular color strips.

The invention provides decoupled two-conductor lines with identical transmission properties, and it is, accordingly, possible to form phantom circuits each comprising two conductor lines (side circuits). The advantage of such phantom circuits is that the ratio between mutual capacity of the phantom circuit and the mutual capacity of the individual circuits is the same or nearly equal to 2 and that capacitive couplings, which are disturbingly present in the case of twisted quads, are very much reduced since they are, as already mentioned, present for only a fraction of the length.

FIG. 4 illustrates the manner of forming phantom circuits by utilizing a cable layer with sixteen individual conductors 9 to 24. Two side circuits $St$ and one phantom circuit $Ph$ can be formed from four even numbered or odd numbered conductors. FIG. 4 shows as an example the following transmission circuits:

(1) Side circuit $St_{11}$ ------ Conductors 9 and 17.
(2) Side circuit $St_{12}$ ------ Conductors 13 and 21.
(3) Side circuit $St_{21}$ ------ Conductors 10 and 18.
(4) Side circuit $St_{22}$ ------ Conductors 14 and 22.
(5) Phantom circuit $Ph_1$-- Side circuits $St_{11}$ and $St_{12}$.
(6) Phantom circuit $Ph_2$---- Side circuits $St_{21}$ and $St_{22}$.

The invention is particularly advantageously applicable in the case of communication cables having conductors provided with insulation made of synthetic material, for example, foam material insulation. In the production of communication cables comprising units of conductors, there is the possibility to insulate the conductors and to lay them in units in one and the same or in different extrusion machines. The conductor crossings and exchanging are advantageously automatically effected in stranding machine during the stranding of the conductors to form a layer, whereby the exchanging can be effected by an electronic program device.

Various features of the invention may be changed or modified. For example, the conductor crossings may be effected in part by hand or by manually controlled devices and in part automatically. The exchanging of groups of conductors between neighboring layers, in cases requiring only few position exchange points per manufactured or fabricated length, may be effected by means of manually operable devices with the stranding machine standing still. Automatic control and conductor crossing is to be recommended in cases requiring relatively closely spaced conductor crossing. The feature relating to the provision of crossing sections $s$ of different length, for reducing the layer-to-layer coupling in neighboring layers, may be modified as compared with FIG. 5, by making the crossing sections of the inner layer larger, for example, twice as large as those of the outer layer. FIG. 3 shows in connection with the conductors-position-change sections $k_1$–$k_4$ for the sake of clarity only the crossings required for the change of sequence of the conductors. It is clear that slight residual couplings would remain in the decoupling section $p$ if all other conductors would be connected straight through. It may for this reason be suitable to mutually exchange within each conductors-position-change section also the conductors which are shown without crossings, so that the sequence of the conductors is preserved at the beginning and at the end of each conductors-position-exchange section while the residual couplings are eliminated.

Changes may be made within the scope and spirit of the appended claims which define what is believed to be new and desired to have protected by Letters Patent.

I claim:

1. A communication cable comprising at least one layer of unshielded individual insulated conductors, stranded in the same direction, said stranded layer comprising a number of individual conductors which is a multiple of four, whereby, with consecutive numbering of the conductors of one layer, following each other in circumferential direction, one even numbered conductor is always positioned adjacent to one odd numbered conductor, with each two even numbered conductors and each two odd numbered conductors of the stranded layer forming respectively a two-conductor line for a communication circuit, said cable being subdivided throughout its length into respective crossing sections, the length of which is short as compared with the fabrication length of the cable, all conductors within such a crossing section extending substantially parallel with respect to one another over a predetermined portion of such crossing section, at the end of which all conductors of the stranded layer are crossed, with all even numbered conductors being crossed with all odd numbered conductors in opposite rotational directions whereby each odd numbered conductor occupies the position that the preceding part of an adjacent even numbered conductor would otherwise have occupied, and vice versa, the conductors so transposed extending generally parallel over the next predetermined portion of the cable, and at the end of such portion, the respective conductors are similarly transposed in the same rotational directions, said conductors being similarly transposed at the end of subsequent portions of said cable, with the intermediate portions of the conductors disposed between crossing points extending substantially parallel, until a rotational displacement of the conductors reaches 180° relative to the starting position, the respective rotational directions of the even numbered and odd numbered conductors thereafter being reversed at subsequent crossing points until, after a like number of cable portions, in which the conductors extend generally parallel, and crossing points, the original counting sequence at the beginning of the crossing section is restored.

2. A communication cable comprising at least one layer of unshielded individual insulated conductors, stranded in the same direction, said stranded layer comprising a number of individual conductors which is a multiple of four, whereby, with consecutive numbering of the conductors of one layer, following each other in circumferential direction, one even numbered conductor is always positioned adjacent to one odd numbered conductor, with each two even numbered conductors and each two odd numbered conductors of the stranded layer forming respectively a two conductor line for a communication circuit, said cable being subdivided throughout its length into respective crossing sections, the length of which is short as compared with the fabrication length of the cable, and into position-changed sections alternating with said crossing sections, the length of which is short as compared with the fabrication length of the cable, all conductors within such a crossing section extending substantially parallel with respect to one another over a predetermined portion of such crossing section, at the end of which all conductors of the stranded layer are crossed, with all even numbered conductors being crossed with all odd numbered conductors in opposite rotational directions whereby each odd numbered conductor occupies the position that the preceding part of an adjacent even numbered conductor would otherwise have occupied, and vice versa, the conductors so transposed extending generally parallel over the next predetermined portion of the cable, and at the end of such portion, the respective conductors are similarly transposed in the same rotational directions, said conductors being similarly transposed at the end of subsequent portions of said cable, with the intermediate portions of the conductors disposed between said crossing points extending substantially parallel, until a rotational displacement of the conductors reaches 180° relative to the starting position, the respective rotational directions of the even numbered and odd numbered conductors thereafter being reversed at subsequent crossing points until, after a like number of cable portions, in which the conductors extend generally parallel, and crossing points, the original counting sequence at the beginning of the crossing section is restored, at least two even numbered conductors having their positions transposed, and at least two odd numbered conductors having their positions transposed within each respective position-change section.

References Cited by the Examiner

UNITED STATES PATENTS

| | | | |
|---|---|---|---|
| 473,353 | 4/1892 | Sawyer | 174—113 X |
| 478,367 | 7/1892 | Sawyer | 174—34 |

FOREIGN PATENTS

| | | |
|---|---|---|
| 878,062 | 9/1961 | Great Britain. |

JOHN F. BURNS, *Primary Examiner.*

LARAMIE E. ASKIN, *Examiner.*